(12) United States Patent
Yi et al.

(10) Patent No.: US 9,329,742 B2
(45) Date of Patent: May 3, 2016

(54) CAPACITIVE TOUCH PANEL

(71) Applicant: Quanta Computer Inc., Taoyuan Shien (TW)

(72) Inventors: Chien-Yu Yi, Taoyuan County (TW); Kuo-Liang Shen, Taipei (TW); Ching-Feng Chen, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 73 days.

(21) Appl. No.: 14/301,712

(22) Filed: Jun. 11, 2014

(65) Prior Publication Data
US 2015/0227233 A1   Aug. 13, 2015

(30) Foreign Application Priority Data
Feb. 10, 2014   (TW) .............................. 103104274 A

(51) Int. Cl.
*G06F 3/045*   (2006.01)
*G06F 3/044*   (2006.01)
*G06F 3/041*   (2006.01)

(52) U.S. Cl.
CPC .............. *G06F 3/044* (2013.01); *G06F 3/0416* (2013.01)

(58) Field of Classification Search
CPC combination set(s) only.
See application file for complete search history.

(56) References Cited

U.S. PATENT DOCUMENTS

| 2012/0105081 A1* | 5/2012 | Shaikh ................. G06K 9/0002 324/686 |
| 2012/0229148 A1* | 9/2012 | Hsu ....................... G06F 3/0416 324/658 |
| 2012/0235931 A1* | 9/2012 | Lee .......................... G06F 3/044 345/173 |
| 2013/0154979 A1* | 6/2013 | Li ........................... G06F 3/041 345/173 |
| 2013/0154995 A1* | 6/2013 | Trend ....................... G06F 3/044 345/174 |
| 2013/0307789 A1* | 11/2013 | Karamath ............... G06F 3/016 345/173 |
| 2014/0118302 A1* | 5/2014 | Park ....................... G06F 3/044 345/174 |
| 2014/0210772 A1* | 7/2014 | Yang ....................... G06F 3/044 345/174 |
| 2014/0346028 A1* | 11/2014 | Lin ..................... H03K 17/9622 200/600 |

* cited by examiner

*Primary Examiner* — Pegeman Karimi
(74) *Attorney, Agent, or Firm* — Rabin & Berdo, P.C.

(57) ABSTRACT

A capacitive touch panel provides a partially high-resolution by mixing multiple resolutions. The capacitive touch panel includes a first electrode layer, a second electrode layer, an insulating layer, and a single one integrated circuit chip. The first electrode layer and the second electrode layer respectively include multiple sensor electrodes disposed with uneven density, so that a part of the touch panel has higher resolution, and other part of the touch panel has lower resolution. The capacitive touch panel provides partially higher resolution by adjusting the distribution of the electrodes without increasing the number of pins of the integrated circuit chip.

10 Claims, 8 Drawing Sheets

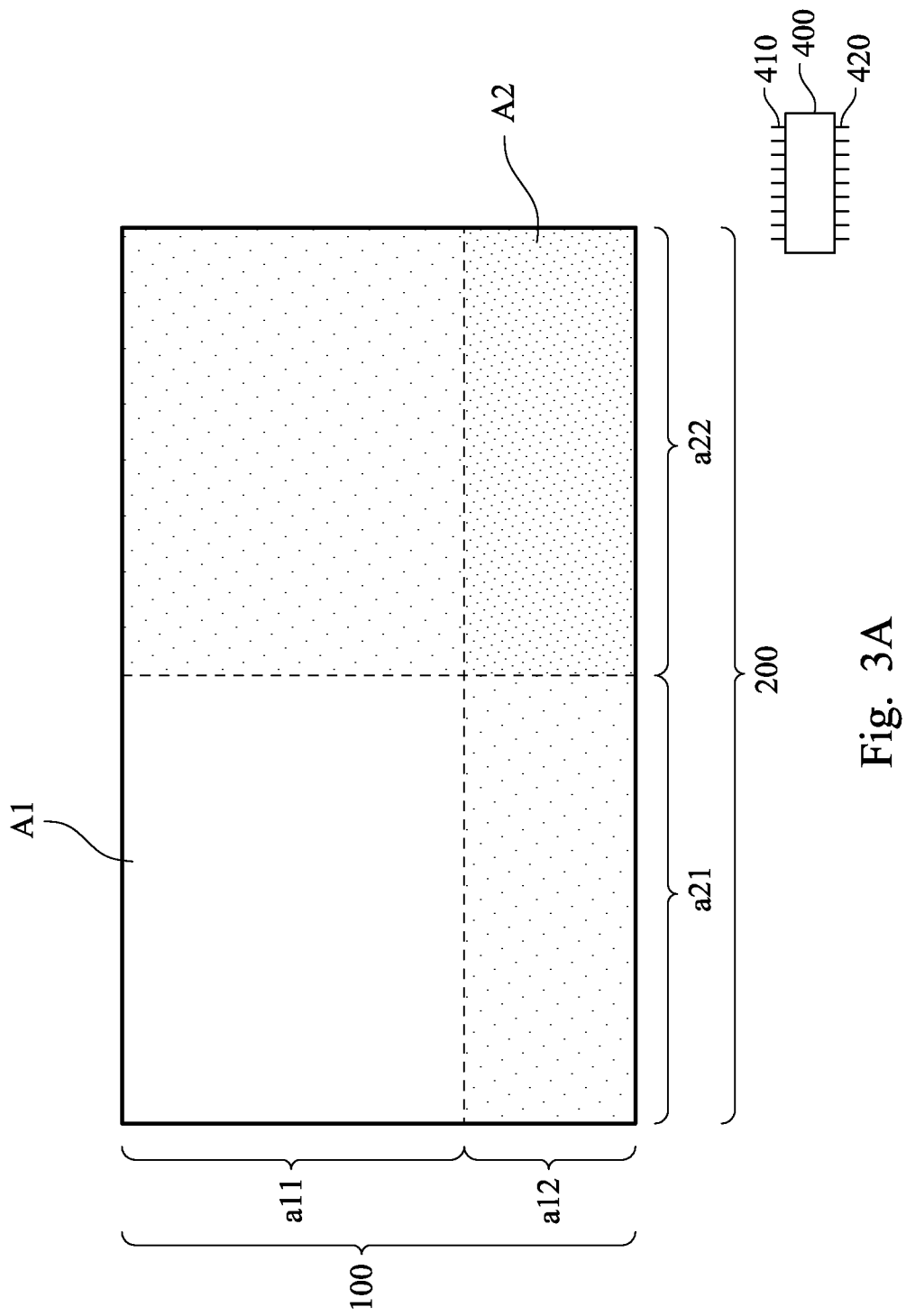

CAPACITIVE TOUCH PANEL

RELATED APPLICATIONS

This application claims priority to Taiwan Application Serial Number 103104274, filed Feb. 10, 2014, which is herein incorporated by reference.

BACKGROUND

1. Field of Invention

The present invention relates to a capacitive touch panel. More particularly, the present invention relates to a capacitive touch panel with a high-resolution.

2. Description of Related Art

Touch panels are widely applied in daily life, and the development of touch panels continues. Digits and styli are now used to contact touch panels which cause capacitance variations in the sensing electrodes, which allow the machine to identify the position of touch. Digits are used as ordinary command elements in the ordinary operation of touch panels. However, in the need of fine operation, styli may take the place of fingers with their ability to be utilized in finer operation upon the touch panel. Comparably, requirements for the sensitivity of touch panels continue to increase.

For upgrading the sensitivity of the touch panel to meet the requirement of the styli, in addition to enhancing the density of the electrodes, the numbers of the pins of the integrated circuit chip should also be enhanced. For the large-scale touch panels, which need a large number of pins, it is difficult to increase the number of the pins due to market cost, and the solutions may often be a series of connecting plural integrated circuit chips, but this method is likely to increase the fabrication cost of the device.

SUMMARY

The invention provides a capacitive touch panel. The capacitive touch panel has an electrode configuration of mixing density and has an advantage of a high-resolution partially and reducing cost.

According to one aspect of the present invention, a capacitive touch panel includes a first electrode layer, a second electrode layer, an insulating layer, and a single integrated circuit chip. The first electrode layer includes plural first sensing electrode series linearly arranged along a first direction and disconnected from each other. Each of the first sensing electrode series includes plural first sensing electrodes. One portion of the adjacent first sensing electrodes are spaced by a first wide pitch, and another portion of the adjacent first sensing electrodes are spaced by a first narrow pitch, in which the first wide pitch is longer than the first narrow pitch. The second electrode layer includes plural second sensing electrode series linearly arranged along a second direction and disconnected to each other, in which the first direction is orthogonal to the second direction. The insulating layer is used for electrically insulating the first electrode layer from the second electrode layer. The single integrated circuit chip includes plural pins connected to the first sensing electrode series and the second sensing electrode series respectively for detecting a capacitance variation.

According to one or more embodiments of the present invention, the integrated circuit chip includes plural driving pins and plural receiving pins. The driving pins are connected to the first sensing electrode series. The first wide pitch and the first narrow pitch are along the second direction. The first wide pitch is longer than a value of dividing a sensing length of the capacitive touch panel in the second direction to a number of the driving pins, and the first narrow pitch is shorter than a value of dividing the sensing length of the capacitive touch panel in the second direction to the number of the driving pins. The receiving pins are connected to the second sensing electrode series.

According to one or more embodiments of the present invention, the integrated circuit chip includes plural driving pins and plural receiving pins. The driving pins are connected to the first sensing electrode series. The first wide pitch and the first narrow pitch are along the first direction. The first wide pitch is longer than a value of dividing a sensing length of the capacitive touch panel in the first direction to a number of the receiving pins, and the first narrow pitch is shorter than a value of dividing the sensing length of the capacitive touch panel in the first direction to the number of the receiving pins. The receiving pins are connected to the second sensing electrode series.

According to one or more embodiments of the present invention, one portion of the adjacent second sensing electrodes are spaced by a second wide pitch, and another portion of the adjacent second sensing electrodes are spaced by a second narrow pitch, in which the second wide pitch is longer than the second narrow pitch.

According to one or more embodiments of the present invention, the integrated circuit chip includes plural driving pins and plural receiving pins. The driving pins are connected to the first sensing electrode series. The second wide pitch and the second narrow pitch are along the second direction. The second wide pitch is longer than a value of dividing a sensing length of the capacitive touch panel in the second direction to a number of the driving pins, and the second narrow pitch is shorter than a value of dividing the sensing length of the capacitive touch panel in the second direction to the number of the driving pins.

According to one or more embodiments of the present invention, the integrated circuit chip includes plural driving pins and plural receiving pins. The receiving pins are connected to the second sensing electrode series. The second wide pitch and the second narrow pitch are along the first direction. The second wide pitch is longer than a value of dividing a sensing length of the capacitive touch panel in the first direction to a number of the receiving pins, and the second narrow pitch is shorter than a value of dividing the sensing length of the capacitive touch panel in the first direction to the number of the receiving pins.

According to one or more embodiments of the present invention, the second wide pitch is of a length between about 4.5 millimeters and about 6.5 millimeters, and the second narrow pitch is of a length between about 1.5 millimeters and about 2.5 millimeters.

According to one or more embodiments of the present invention, the first wide pitch is of a length between about 4.5 millimeters and about 6.5 millimeters, and the first narrow pitch is of a length between about 1.5 millimeters and about 2.5 millimeters.

According to another aspect of the present invention, a capacitive touch panel includes a first electrode layer, a second electrode layer, an insulating layer, and a single integrated circuit chip. The first electrode layer includes a first high-density electrode area and a first low-density electrode area. The second electrode layer includes a second high-density electrode area and a second low-density electrode area. The first high-density electrode area and the second high-density electrode area are at least partially overlapped and constitute a high-density sensing region, and the first low-density electrode area and the second low-density electrode area are at least partially overlapped and constitute a low-density sensing region. The insulating layer is used for electrically insulating the first electrode layer from the second electrode layer. The single integrated circuit chip includes plural pins connected to the first sensing electrode series and the second sensing electrode series respectively for detecting the capacitance variation.

According to one or more embodiments of the present invention, a size of plural electrode patterns of the low-density sensing region are larger than a size of plural electrode patterns in the high-density sensing region

BRIEF DESCRIPTION OF THE DRAWINGS

The invention can be more fully understood by reading the following detailed description of the embodiment, with reference made to the accompanying drawings as follows:

FIG. 3A is a top view of a capacitive touch panel according to another embodiment of this invention;

DETAILED DESCRIPTION

Figure 1A:
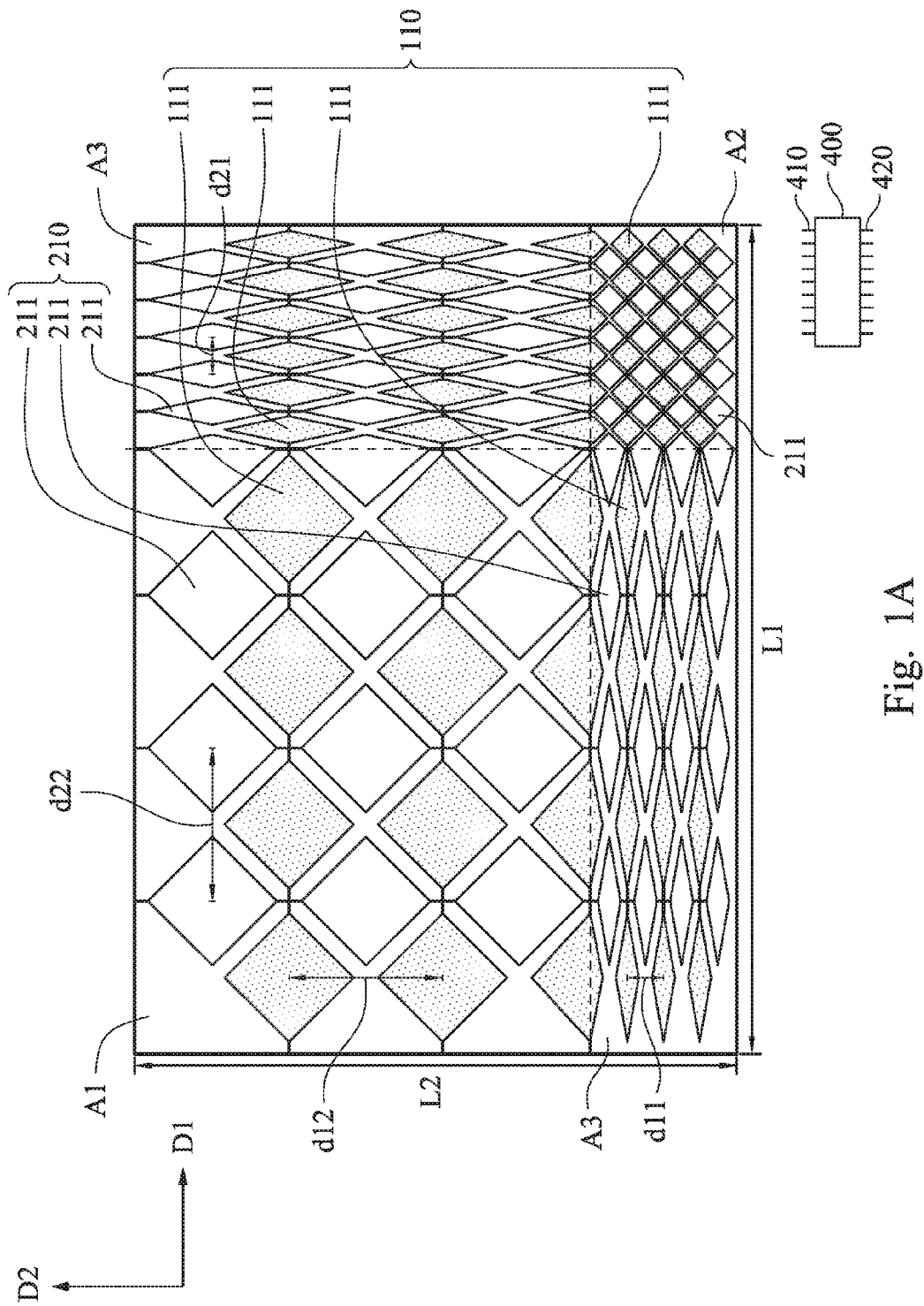
FIG. 1A is a top view of a capacitive touch panel according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 1B:
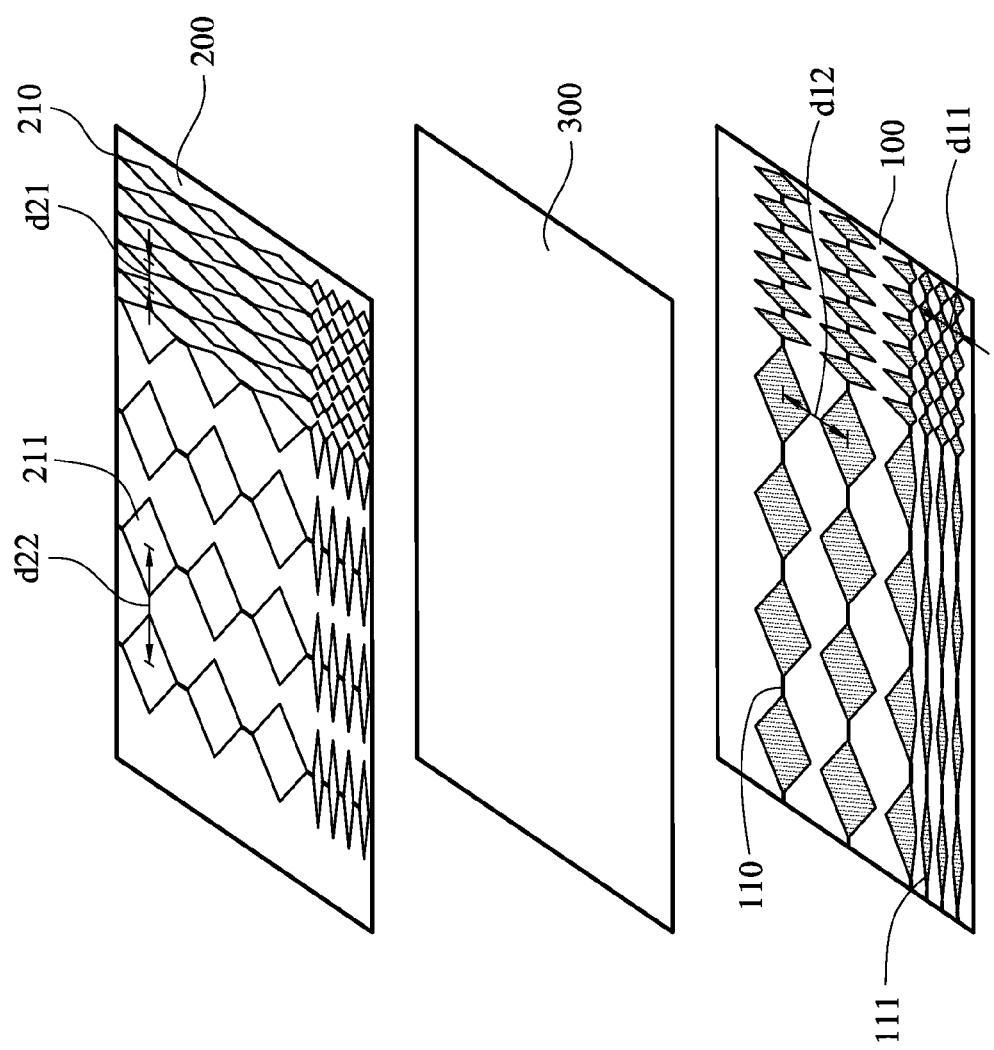
FIG. 1B is an explosive view of a capacitive touch panel of FIG. 1.

Reference is made to FIG. 1A and FIG. 1B, in which FIG. 1A is a top view of a capacitive touch panel according to one embodiment of this invention, and FIG. 1B is an explosive view of the capacitive touch panel of FIG. 1A. The capacitive touch panel includes a first electrode layer 100, a second electrode layer 200, an insulating layer 300, and a single integrated circuit chip 400 (not shown in FIG. 1B). The first electrode layer 100 includes plural first sensing electrode series 110 linearly arranged along a first direction D1 and disconnected to each other. Similarly, the second electrode layer 200 includes plural second sensing electrode series 210 linearly arranged along a second direction D2 and disconnected from each other, and the first direction D1 is orthogonal to the second direction D2. The insulating layer 300 is used for electrically insulating the first electrode layer 100 from the second electrode layer 200. The single integrated circuit chip 400 includes plural pins connected to the first sensing electrode series 110 and the second sensing electrode series 210 respectively for detecting a capacitance variation. In the present invention, the capacitive touch panel provides partial higher resolutions by adjusting the configuration of the density of the first sensing electrode series 110 of the first electrode layer 100 or the density of the second sensing electrode series 210 of the second electrode layer 200.

The first sensing electrode series 110 have plural first sensing electrodes 111, and the second sensing electrode series 210 have plural second sensing electrodes 211. In this embodiment, the first sensing electrodes 111 and the second sensing electrodes 211 are substantially in a diamond shape. The single integrated circuit chip 400 includes plural driving pins 410 and plural receiving pins 420, in which the driving pins 410 are connected to the first sensing electrode series 110 and the receiving pins 420 are connected to the second sensing electrode series 210.

It should be noted that the conductive wires connecting the single integrated circuit chip 400 and the first sensing electrode series 110 or the second sensing electrode series 210 are not shown in the figures of this embodiment or the following embodiments. Also, the first sensing electrode series 110, the first sensing electrodes 111, the second sensing electrode series 210, the second sensing electrodes 211, plural driving pins 410, and plural receiving pins 420 are illustrated against the actual numbers. A person skilled in the art can change the numbers of the first sensing electrode series 110, the first sensing electrodes 111, the second sensing electrode series 210, the second sensing electrodes 211, the driving pins 410, and the receiving pins 420, and adjust the shapes of the first sensing electrodes 111 and the second sensing electrodes 211 according to the desired outcome.

One portion of the adjacent first sensing electrodes 111 are spaced by a first wide pitch d12, and another portion of the adjacent first sensing electrodes 111 are spaced by a first narrow pitch d11, and the first wide pitch d12 is longer than the first narrow pitch d11. That is, every two adjacent first sensing electrode series 110 are spaced by the first wide pitch d12 or the first narrow pitch d11. The first wide pitch d12 and the first narrow pitch d11 herein indicate the distance between two centers of two adjacent first sensing electrodes 111.

In this embodiment, the first wide pitch d12 and the first narrow pitch d11 are along the second direction D2. For the uneven distribution of the sensing electrode series, the first narrow pitch d11 is shorter than a value of dividing a sensing length L2 of the capacitive touch panel in the second direction D2 to a number of the driving pins 410, and the first wide pitch d12 is longer than a value of dividing the sensing length L2 of the capacitive touch panel in the second direction D2 to the number of the driving pins 420. In other words, the first wide pitch d12 is longer than the distance between the electrodes of the capacitive touch panel in the second direction D2 when the electrodes are uniformly distributed. The first narrow pitch d11 is shorter than the distance between the electrodes of the capacitive touch panel in the second direction D2 when the electrodes are uniformly distributed.

Similarly, every two adjacent second sensing electrode series 210 are spaced by a second wide pitch d22 or a second narrow pitch d21. The second wide pitch d22 and the second narrow pitch d21 are along the first direction D1, and the second wide pitch d22 is longer than the second narrow pitch d21. For the uneven distribution of the sensing electrode series, the second narrow pitch d21 is shorter than a value of dividing a sensing length L1 of the capacitive touch panel in the first direction D1 to a number of the receiving pins 420, and the second wide pitch d22 is longer than a value of dividing the sensing length L1 of the capacitive touch panel in the first direction D1 to the number of the receiving pins 420. In other words, the second wide pitch d22 is longer than the distance between the electrodes of the capacitive touch panel in the first direction D1 when the electrodes are uniformly distributed. The second narrow pitch d21 is shorter than the distance between the electrodes of the capacitive touch panel in the first direction D1 when the electrodes are uniformly distributed.

In accordance with the standards of human digits and common styli, the first wide pitch d12 and the second wide pitch d22 are of a length between about 4.5 millimeters and about 6.5 millimeters, and the first narrow pitch d11 and the second narrow pitch d21 are of a length between about 1.5 millimeters and about 2.5 millimeters. In this embodiment, the first narrow pitch d11 or the first wide pitch d12 can be the distance between the two adjacent first sensing electrodes 111 in the second direction D2, and the second narrow pitch d21 or the second wide pitch d22 can be the distance between the two adjacent second sensing electrodes 211 in the first direction D1, but such a configuration is not intended to limit the scope of this invention.

As a result, after the first electrode layer 100 and the second electrode layer 200 are stacked, plural areas with various electrode distributing densities are formed on the touch panel, and the areas include a low-density sensing area A1, a high-density sensing area A2, and mid-density sensing areas A3. The low-density sensing area A1 is an area with the first wide pitch d12 and the second wide pitch d22, and the low-density sensing area A1 has a relatively low-resolution and can be used for the touch of large objects, for example, fingers. The high-density sensing area A2 is an area with the first narrow pitch d11 and the second narrow pitch d21, and the high-density sensing area A2 has a relatively high-resolution and can be used for the touch of small objects, for example, styli. The mid-density sensing areas A3 are an area with the first narrow pitch d11 and the second wide pitch d22 and an area with the first wide pitch d12 and the second narrow pitch d21.

Moreover, the first sensing electrodes 111 and the second sensing electrodes 211 on the sensing electrode series can be resized in conformity with the different pitches between the sensing electrode series. A size of the sensing electrode patterns of the low-density sensing area A1 is larger than a size of the sensing electrode patterns of the high-density sensing area A2. For example, referring to FIG. 1A, the low-density sensing area A1 has larger sensing electrode patterns, and the high-density sensing area A2 has small sensing electrode patterns. The mid-density sensing areas A3 have sensing electrode patterns with a size between the above two. The sensing electrode patterns of the mid-density sensing areas A3 suffer from the uneven distribution of the electrodes, so the sensing electrode patterns of the mid-density sensing areas A3 have inconsistent length ratios. In this embodiment, the first sensing electrodes 111 have similar patterns as the second sensing electrodes 211, but such a configuration is not intended to limit the scope of this invention.

The driving pins 410 of the integrated circuit chip 400 are connected to the first sensing electrode series 110. In the design of the capacitive touch panel, to cleverly exploit the driving pins 410 of the integrated circuit chip 400, the number of the driving pins 410 of the integrated circuit chip 400 should be the same as the number of the first sensing electrode series 110. As a result, the longest length of the high-density sensing area A2 in the second direction D2 can be inferred from the number of the driving pins 410 of the integrated circuit chip 400 (the number of the first sensing electrode series 110), the first narrow pitch d11, the first wide pitch d12, and the length of the capacitive touch panel in the second direction D2. Also, the longest length of the capacitive touch panel in the second direction D2 can be inferred from the number of the driving pins 410 of the integrated circuit chip 400 (the number of the first sensing electrode series 110), the first narrow pitch d11, the first wide pitch d12, and the preset length of the high-density sensing area A2 in the second direction D2. In addition, the lengths of the first narrow pitch d11 and the first wide pitch d12 can be tuned according to the various sizes of the touch panels, and such details are not repeated herein.

Comparably, the receiving pins 420 of the integrated circuit chip 400 are connected to the second sensing electrode series 210. In the design of the capacitive touch panel, to cleverly exploit the receiving pins 420 of the integrated circuit chip 400, the number of the receiving pins 420 of the integrated circuit chip 400 should be the same as the number of the second sensing electrode series 210. As a result, the longest length of the high-density sensing area A2 in the first direction D1 can be inferred from the number of the receiving pins 420 of the integrated circuit chip 400 (the number of the second sensing electrode series 210), the second narrow pitch d21, the second wide pitch d22, and the length of the capacitive touch panel in the first direction D1. Also, the longest length of the capacitive touch panel in the first direction D1 can be inferred from the number of the receiving pins 420 of the integrated circuit chip 400 (the number of the second sensing electrode series 210), the second narrow pitch d21, the second wide pitch d22, and the preset length of the high-density sensing area A2 in the first direction D1. Additionally, the lengths of the second narrow pitch d21 and the second wide pitch d22 can be tuned according to the various sizes of the touch panels, and such details are not repeated herein.

Figure 2A:
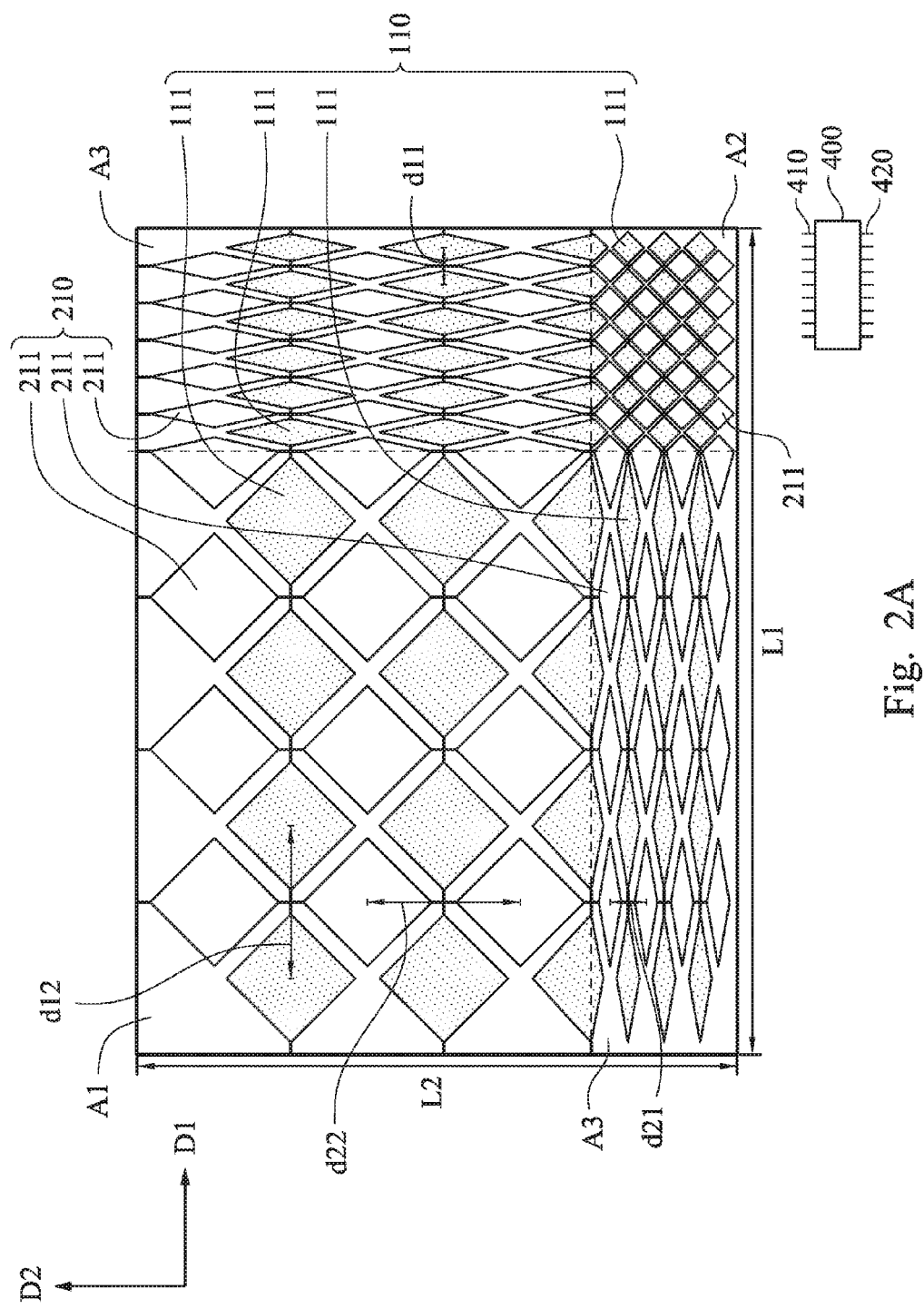
FIG. 2A is a top view of a capacitive touch panel according to another embodiment of this invention.
Figure 2B:
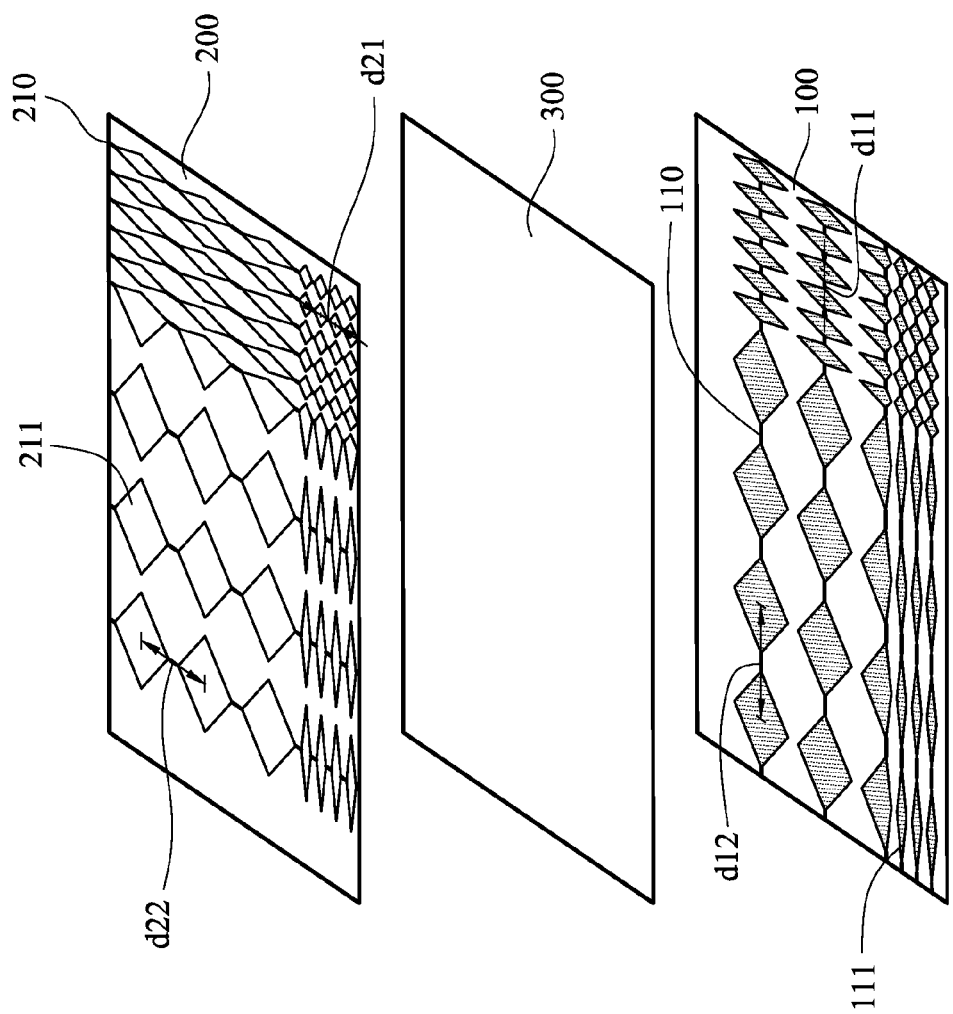
FIG. 2B is an explosive view of a capacitive touch panel of FIG. 2A.

Reference is now made to FIG. 2A and FIG. 2B, in which FIG. 2A is a top view of a capacitive touch panel according to another embodiment of this invention, and FIG. 2B is an explosive view of a capacitive touch panel of FIG. 2A. The embodiment in FIG. 2A and FIG. 2B are similar as the embodiment in FIG. 1A and FIG. 1B. The difference between two embodiments is the definition of the pitches. In FIG. 2A and FIG. 2B, the first narrow pitch d11 or the first wide pitch d12 is defined as the distance between the every two adjacent first sensing electrodes 111 in the first direction D1, while in FIG. 1A and FIG. 1B, the first narrow pitch d11 or the first wide pitch d12 is defined as the distance between the every two adjacent first sensing electrode series 110 (which is the distance between the every two adjacent first sensing electrodes 111 in the second direction D2). Comparably, in FIG. 2A and FIG. 2B, the second narrow pitch d21 or the second wide pitch d22 is defined as the distance between the every two adjacent second sensing electrodes 211 in the second direction D2, while in FIG. 1A and FIG. 1B, the second narrow pitch d21 or the second wide pitch d22 is defined as the distance between the every two adjacent second sensing electrode series 210 (which is the distance between the every two adjacent second sensing electrodes 211 in the first direction D1). Therefore, the control variables are no longer the distances between the sensing electrode series but the distances between the sensing electrodes in the direction of the sensing electrode series respectively.

Reference is now made to FIG. 2A. Every two adjacent first sensing electrodes 111 in the first direction D1 are spaced by a first wide pitch d12 or a first narrow pitch d11. The first wide pitch d12 and the first narrow pitch d11 are along the first direction D1, and the first wide pitch d12 is longer than the first narrow pitch d11. For the uneven distribution of the sensing electrode series, the first narrow pitch d11 is shorter than a value of dividing the sensing length L1 of the capacitive touch panel in the first direction D1 to the number of the receiving pins 420, and the first wide pitch d12 is longer than a value of dividing the sensing length L1 of the capacitive touch panel in the first direction D1 to the number of the receiving pins 420. That is, the first wide pitch d12 is longer than the distance between the electrodes of the capacitive touch panel in the first direction D1 when the electrodes are uniformly distributed. The first narrow pitch d11 is shorter than the distance between the electrodes of the capacitive touch panel in the first direction D1 when the electrodes are uniformly distributed.

Similarly, every two adjacent second sensing electrodes 211 in the second direction D2 are spaced by a second wide pitch d22 or a second narrow pitch d21. The second wide pitch d22 and the second narrow pitch d21 are along the second direction D1, and the second wide pitch d22 is longer than the second narrow pitch d21. For the uneven distribution of the sensing electrode series, the second narrow pitch d21 is shorter than a value of dividing the sensing length L2 of the capacitive touch panel in the second direction D2 to the number of the driving pins 410, and the second wide pitch d22 is longer than a value of dividing the sensing length L2 of the capacitive touch panel in the second direction D2 to the number of the driving pins 410. In other words, the second wide pitch d22 is longer than the distance between the electrodes of the capacitive touch panel in the second direction D2 when the electrodes are uniformly distributed. The second narrow pitch d21 is shorter than the distance between the electrodes of the capacitive touch panel in the second direction D2 when the electrodes are uniformly distributed.

In accordance with the standards of human digits and common styli, the first wide pitch d12 and the second wide pitch d22 are of a length between about 4.5 millimeters and about 6.5 millimeters, and the first narrow pitch d11 and the second narrow pitch d21 are of a length between about 1.5 millimeters and about 2.5 millimeters, but such details are not intended to limit the scope of this invention.

As a result, after the first electrode layer 100 and the second electrode layer 200 are stacked, plural areas with various electrode distributing densities are formed on the touch panel, and the areas include a low-density sensing area A1, a high-density sensing area A2, and mid-density sensing areas A3. The low-density sensing area A1 is an area with the first wide pitch d12 and the second wide pitch d22, and the low-density sensing area A1 has a relatively low-resolution and can be used for the touch of large objects, for example, fingers. The high-density sensing area A2 is an area with the first narrow pitch d11 and the second narrow pitch d21, and the high-density sensing area A2 has a relatively high-resolution and can be used for the touch of small objects, for example, styli. The mid-density sensing areas A3 are an area with the first narrow pitch d11 and the second wide pitch d22 and an area with the first wide pitch d12 and the second narrow pitch d21.

Moreover, the first sensing electrodes 111 and the second sensing electrodes 211 on the sensing electrode series can be resized in conformity with the pitches between the sensing electrode series. A size of the sensing electrode patterns of the low-density sensing area A1 is larger than a size of the sensing electrode patterns of the high-density sensing area A2. For example, the low-density sensing area A1 has large sensing electrode patterns, and the high-density sensing area A2 has small sensing electrode patterns. The mid-density sensing areas A3 have sensing electrode patterns with a size between the above two. The sensing electrode patterns of the mid-density sensing areas A3 suffer from the uneven distribution of the electrodes and have inconsistent length ratios. In this embodiment, the first sensing electrodes 111 have similar patterns as the second sensing electrodes 211, but such a configuration is not intended to limit the scope of this invention.

Figure 3B:
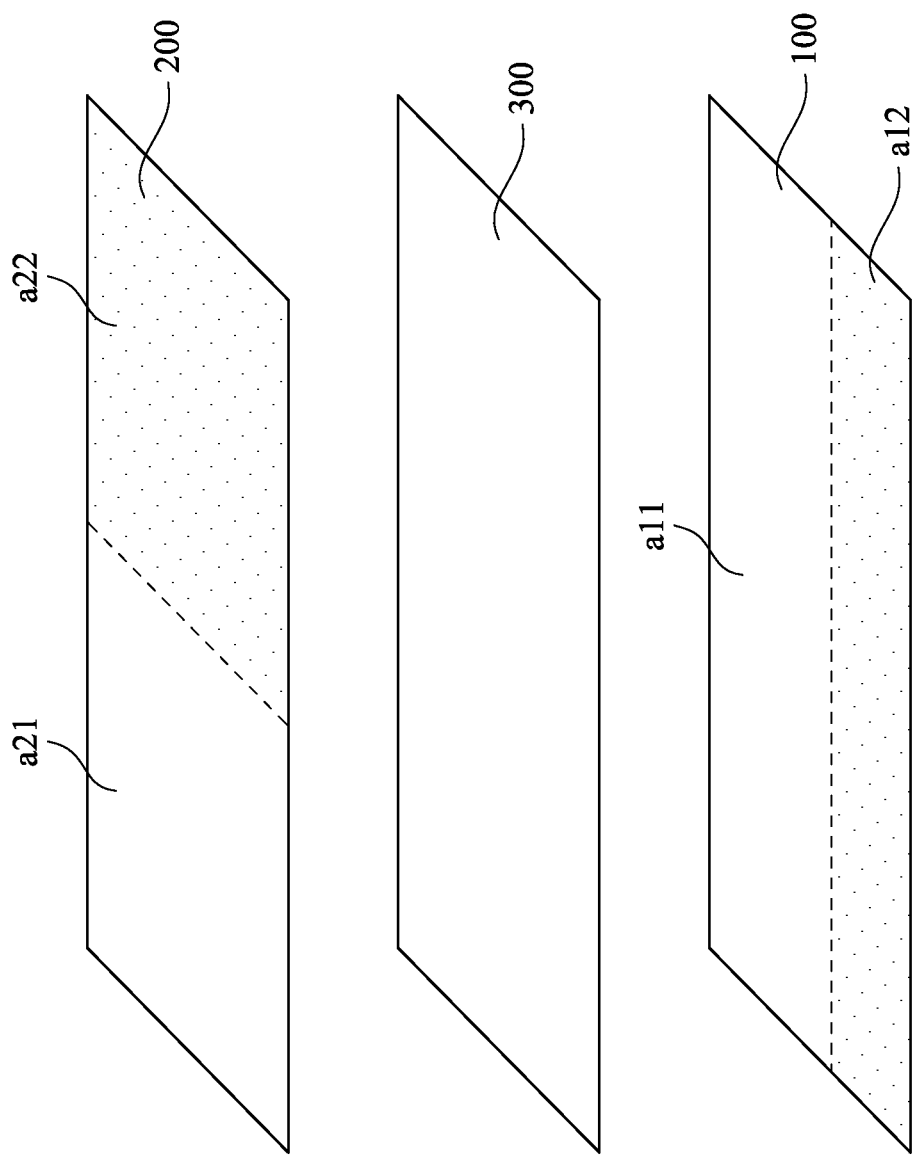
FIG. 3B is an explosive view of a capacitive touch panel of FIG. 3A.

Reference is made to FIG. 3A and FIG. 3B. FIG. 3A is a top view of a capacitive touch panel according to another embodiment of this invention, and FIG. 3B is an explosive view of a capacitive touch panel of FIG. 3A. A capacitive touch panel includes a first electrode layer 100, a second electrode layer 200, an insulating layer 300, and a single integrated circuit chip 400. The insulating layer 300 is used for electrically insulating the first electrode layer 100 from the second electrode layer 200. The single integrated circuit chip 400 includes plural driving pins 410 and plural receiving pins 420, which are connected to the first electrode layer 100 and the second electrode layer 200 for detecting the capacitance variation.

The first electrode layer 100 includes a first low-density electrode area a11 and a first high-density electrode area a12 disposed on the upper and lower sides of the first electrode layer 100 respectively. The second electrode layer 200 includes a second low-density electrode area a21 and a second high-density electrode area a22 disposed on the left and right sides of the second electrode layer 200 respectively. The directional terms, such as the left side, right side, upper side, and lower side, are used for illustrating this invention and are intended to limit the scope of this invention.

After the first electrode layer 100 and the second electrode layer 200 are stacked, the first high-density electrode area a12 and the second high-density electrode area a22 are at least partially overlapped and constitute a high-density sensing region A2. The first low-density electrode area a11 and the second low-density electrode area a21 are at least partially overlapped and constitute a low-density sensing region A1. As shown in the figure, the low-density sensing region A1 and the high-density sensing region A2 are formed on the upper left side and the lower right side of the capacitive touch panel respectively.

Therefore, the capacitive touch panel includes the low-density sensing region A1 and the high-density sensing region A2. The low-density sensing region A1 has a general resolution, which is applicable to ordinary touch panels. The high-density sensing region A2 has a higher-resolution, which is applicable to stylus touch panels, such as signatures. The capacitive touch panel includes plural electrode patterns with different sizes, in which the electrode patterns of the low-density sensing region A1 have a larger size than the electrode patterns of the high-density sensing region A2. For the purposes of mixing the density, the resolutions of the capacitive touch panel can be partially enhanced under the premise of remaining the number of chip pins without increasing the number.

Figure 4:
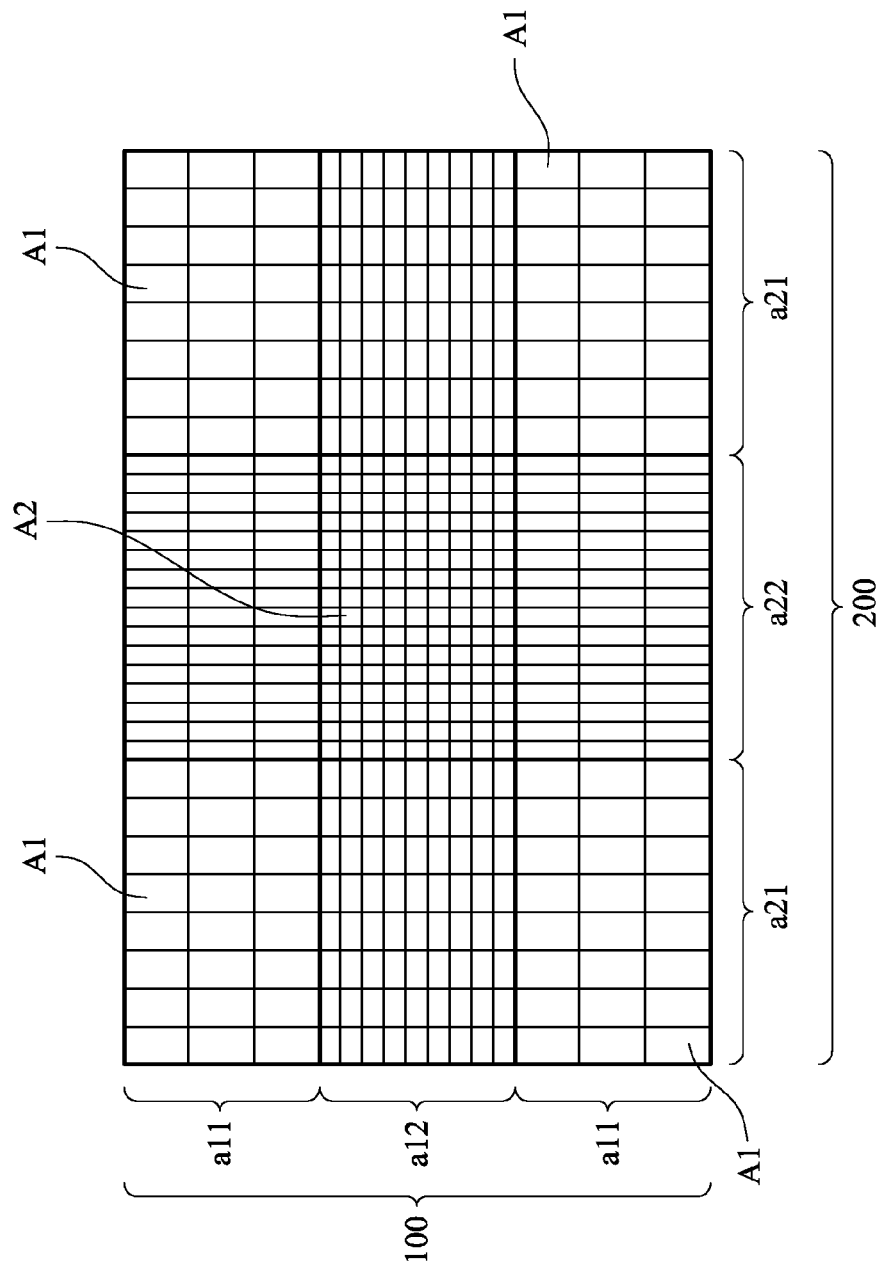
FIG. 4 is a top view of a capacitive touch panel according to another embodiment of this invention.

FIG. 4 is a top view of a capacitive touch panel according to another embodiment of this invention. A capacitive touch panel includes a first electrode layer 100 and a second electrode layer 200. The first electrode layer 100 includes two first low-density electrode areas a11 and a first high-density electrode area a12, and the two first low-density electrode areas a11 are disposed on the upper and lower sides of the first high-density electrode area a12. The second electrode layer 200 includes two second low-density electrode areas a21 and a second high-density electrode area a22, and the two second low-density electrode areas a21 are disposed on left and right sides of the second high-density electrode area a22. The directional terms, such as the left and right sides and the upper and lower sides, are used for illustrating this invention and are not intended to limit the scope of this invention.

After the first electrode layer 100 and the second electrode layer 200 are stacked, the first high-density electrode area a12 and the second high-density electrode area a22 are at least partially overlapped and constitute a high-density sensing region A2. The first low-density electrode areas a11 and the second low-density electrode areas a21 are at least partially overlapped and constitute plural low-density sensing regions A1. Therefore, the high-density sensing region A2 and the low-density sensing regions A1 are formed on the middle and four corners of the capacitive touch panel respectively.

Figure 5:
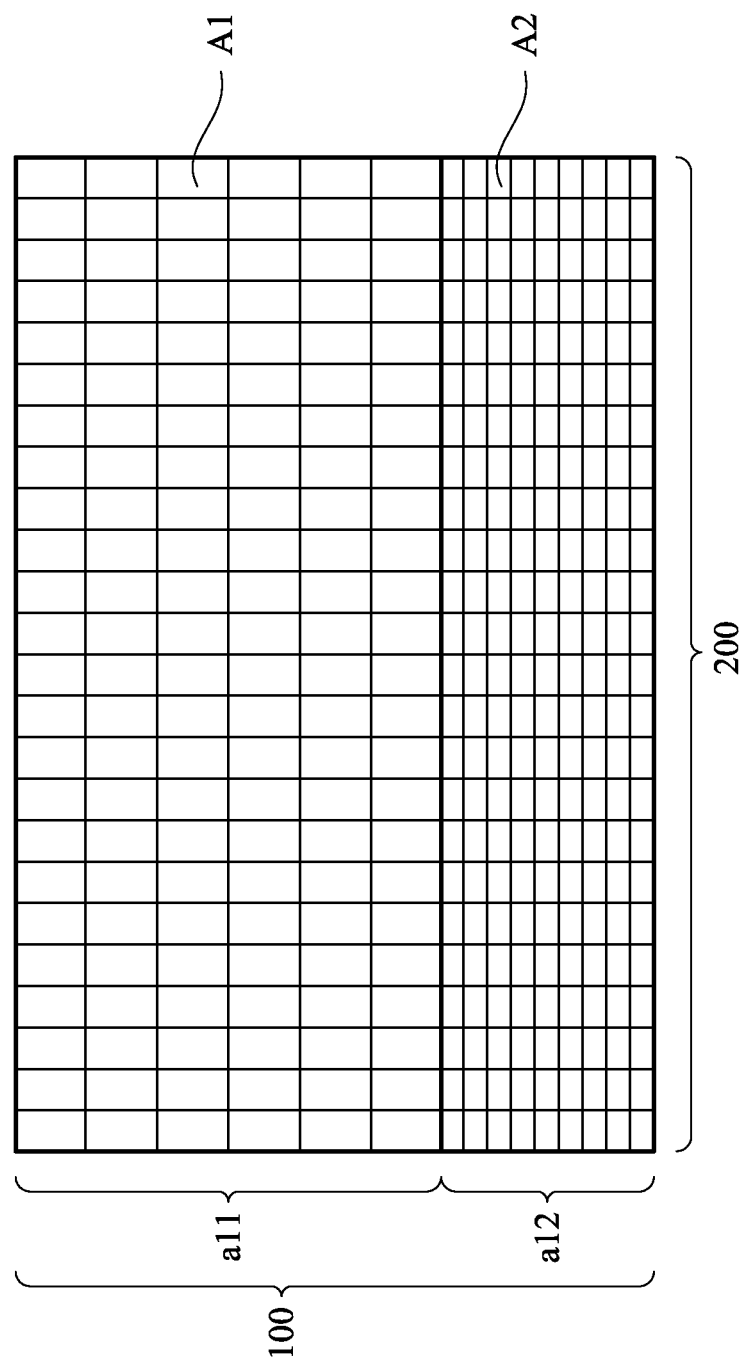
FIG. 5 is a top view of a capacitive touch panel according to another embodiment of this invention.

FIG. 5 is a top view of a capacitive touch panel according to another embodiment of this invention. A capacitive touch panel includes a first electrode layer 100 and a second electrode layer 200. Electrodes on the first electrode layer 100 are distributed with different densities in the vertical direction. The first electrode layer 100 includes a first low-density electrode areas a11 and a first high-density electrode area a12 disposed on the two sides of the first electrode layer 100. Electrodes on the second electrode layer 200 are distributed uniformly in the horizontal direction. The directional terms, such as the vertical direction and horizontal direction, are used for illustrating this invention and are not intended to limit the scope of this invention.

After the first electrode layer 100 and the second electrode layer 200 are stacked, the first low-density electrode areas a11 and the uniformly distributed electrodes of the second electrode layer 200 constitute a low-density sensing region A1. The first high-density electrode areas a12 and the uniformly distributed electrodes of the second electrode layer 200 constitute a high-density sensing region A2. As a result, the low-density sensing region A1 and the high-density sensing region A2 are formed on the two sides of the capacitive touch panel.

In this invention, the sensing electrodes series and the sensing electrodes are controlled and distributed with different densities. As a result, the sensing electrodes of one partial area of the capacitive touch panel have a high-density distribution and provide a higher-resolution, and the sensing electrodes of another partial area of the capacitive touch panel have a low-density distribution and provide a lower-resolution, which makes the capacitive touch panel in this invention applicable to different operating requirements without affording additional cost.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A capacitive touch panel, comprising:
   a first electrode layer comprising a plurality of first sensing electrode series linearly arranged along a first direction and disconnected from each other, wherein each of the first sensing electrode series comprises a plurality of first sensing electrodes, one portion of the adjacent first sensing electrodes are spaced by a first wide pitch, another portion of the adjacent first sensing electrodes are spaced by a first narrow pitch, and the first wide pitch is longer than the first narrow pitch;
   a second electrode layer comprising a plurality of second sensing electrode series linearly arranged along a second direction and disconnected from each other, wherein the first direction is orthogonal to the second direction;
   an insulating layer for electrically insulating the first electrode layer from the second electrode layer; and
   a single integrated circuit chip comprising a plurality of driving pins and a plurality of receiving pins, wherein the driving pins are connected to the first sensing electrode series respectively, and the receiving pins are connected to the second sensing electrode series respectively for detecting a capacitance variation, wherein the first wide pitch and the first narrow pitch are along the second direction, the first wide pitch is longer than a value of dividing a sensing length of the capacitive touch panel in the second direction to a number of the driving pins, the first narrow pitch is shorter than a value of dividing the sensing length of the capacitive touch panel in the second direction to the number of the driving pins.

2. The capacitive touch panel of claim 1, wherein one portion of the adjacent second sensing electrodes are spaced by a second wide pitch, another portion of the adjacent second sensing electrodes are spaced by a second narrow pitch, and the second wide pitch is longer than the second narrow pitch.

3. The capacitive touch panel of claim 2, wherein the integrated circuit chip comprises a plurality of driving pins and a plurality of receiving pins, the receiving pins are connected to the second sensing electrode series, the second wide pitch and the second narrow pitch are along the first direction, the second wide pitch is longer than a value of dividing a sensing length of the capacitive touch panel in the first direction to a number of the receiving pins, and the second narrow pitch is shorter than a value of dividing the sensing length of the capacitive touch panel in the first direction to the number of the receiving pins.

4. The capacitive touch panel of claim 2, wherein the second wide pitch is of a length between about 4.5 millimeters and about 6.5 millimeters, and the second narrow pitch is of a length between about 1.5 millimeters and about 2.5 millimeters.

5. The capacitive touch panel of claim 1, wherein the first wide pitch is of a length between about 4.5 millimeters and about 6.5 millimeters, and the first narrow pitch is of a length between about 1.5 millimeters and about 2.5 millimeters.

6. A capacitive touch panel, comprising:
   a first electrode layer comprising a plurality of first sensing electrode series linearly arranged along a first direction and disconnected from each other, wherein each of the first sensing electrode series comprises a plurality of first sensing electrodes, one portion of the adjacent first sensing electrodes are spaced by a first wide pitch, another portion of the adjacent first sensing electrodes are spaced by a first narrow pitch, and the first wide pitch is longer than the first narrow pitch;
   a second electrode layer comprising a plurality of second sensing electrode series linearly arranged along a second direction and disconnected from each other, wherein the first direction is orthogonal to the second direction;
   an insulating layer for electrically insulating the first electrode layer from the second electrode layer; and
   a single integrated circuit chip comprising a plurality of driving pins and a plurality of receiving pins, wherein the driving pins are connected to the first sensing electrode series respectively, and the receiving pins are connected to the second sensing electrode series respectively for detecting a capacitance variation, wherein the first wide pitch and the first narrow pitch are along the first direction, and the first wide pitch is longer than a value of dividing a sensing length of the capacitive touch panel in the first direction to a number of the receiving pins, the first narrow pitch is shorter than a value of dividing the sensing length of the capacitive touch panel in the first direction to the number of the receiving pins.

7. The capacitive touch panel of claim 6, wherein one portion of the adjacent second sensing electrodes are spaced by a second wide pitch, another portion of the adjacent second sensing electrodes are spaced by a second narrow pitch, and the second wide pitch is longer than the second narrow pitch.

8. The capacitive touch panel of claim 7, wherein the integrated circuit chip comprises a plurality of driving pins and a plurality of receiving pins, the driving pins are connected to the first sensing electrode series, the second wide pitch and the second narrow pitch are along the second direction, the second wide pitch is longer than a value of dividing a sensing length of the capacitive touch panel in the second direction to a number of the driving pins, and the second narrow pitch is shorter than a value of dividing the sensing length of the capacitive touch panel in the second direction to the number of the driving pins.

9. The capacitive touch panel of claim 7, wherein the second wide pitch is of a length between about 4.5 millimeters and about 6.5 millimeters, and the second narrow pitch is of a length between about 1.5 millimeters and about 2.5 millimeters.

10. The capacitive touch panel of claim 6, wherein the first wide pitch is of a length between about 4.5 millimeters and about 6.5 millimeters, and the first narrow pitch is of a length between about 1.5 millimeters and about 2.5 millimeters.

\* \* \* \* \*